United States Patent
Panda et al.

(10) Patent No.: US 9,524,131 B2
(45) Date of Patent: Dec. 20, 2016

(54) PRINTING DEVICE SEARCHING AND MANAGEMENT SYSTEM AND METHOD

(71) Applicant: KYOCERA Document Solutions Inc., Osaka (JP)

(72) Inventors: Debashis Panda, Concord, CA (US); Arthur Alacar, Concord, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/667,161

(22) Filed: Mar. 24, 2015

(65) Prior Publication Data
US 2016/0283173 A1    Sep. 29, 2016

(51) Int. Cl.
*G06F 15/00*    (2006.01)
*G06F 3/12*    (2006.01)
*G06K 15/00*    (2006.01)

(52) U.S. Cl.
CPC ........... *G06F 3/1229* (2013.01); *G06F 3/1285* (2013.01); *G06K 15/002* (2013.01)

(58) Field of Classification Search
CPC .... G06F 3/1204; G06F 3/1229; G06F 3/1253; G06F 3/1285; H04N 1/00278
USPC ....................................................... 358/1.15
See application file for complete search history.

(56) References Cited

U.S. PATENT DOCUMENTS

| | | | |
|---|---|---|---|
| 2010/0157346 A1* | 6/2010 | Waki | H04N 1/00278 358/1.13 |
| 2011/0235117 A1 | 9/2011 | Sugimoto | |
| 2014/0204408 A1* | 7/2014 | Iwashima | H04N 1/00344 358/1.14 |

* cited by examiner

*Primary Examiner* — Mark Milia
(74) *Attorney, Agent, or Firm* — McDonnell Boehnen Hulbert & Berghoff LLP

(57) ABSTRACT

The present disclosure is directed to a printing device searching and management system and method. The method involves receiving a search input comprising a plurality of characters. The method also involves determining a search condition based on a first portion of the plurality of characters. The method further involves determining a command based on a second portion of the plurality of characters. Additionally, the method involves determining whether at least one printing device of the plurality of printing devices meets a criterion specified by the search condition. If at least one printing device meets the criterion, the method involves identifying one or more printing devices that meet the criterion specified by the search condition. Further, the method involves executing the determined command in association with at least one particular printing device from among the identified one or more printing devices on a device specified by the determined command.

19 Claims, 9 Drawing Sheets

| ID | Command | English | Japanese | ... |
|---|---|---|---|---|
| 0000 | keyboard_setting | Set Keyboard | Kībōdo settei | ... |
| 0001 | install_driver | Install Driver | Insutōru konpyūtadoraiba | ... |
| 0002 | restart | Reboot | Saikidō | ... |

PRINTING DEVICE SEARCHING AND MANAGEMENT SYSTEM AND METHOD

BACKGROUND

Unless otherwise indicated herein, the materials described in this section are not prior art to the claims in this application and are not admitted to be prior art by inclusion in this section.

An image forming apparatus may be any peripheral that produces a human-readable representation of graphics and/or text onto a physical medium. Example image forming apparatuses include printers and multifunction peripherals (MFPs). An image forming apparatus may be utilized for various tasks such as printing, scanning, and faxing, as well as many other uses.

In recent years, the number of printing devices in a typical office environment has grown substantially. It is not uncommon for an office to have over one hundred printing devices operating within a local network. Having many printing devices with various features (e.g. copying, facsimile, color printing, and various duplex options) interspersed within an office may provide a convenience for users. However, accessing a particular printing device at a computing device typically involves identifying it from a list of printing device names. As a result, finding a desired printing device can be a difficult task when little information about that printing device is available.

Typically, a user is required to install a printing device driver before accessing the various features of a printing device or performing an action in association with that printing device. However, installing printing device drivers on a computing device for all printing devices within a network may be difficult. Furthermore, installing such a large number of printing device drivers may require a user to sort through and select a desired printing device from a long list of printing devices for each print operation, which can be time consuming.

SUMMARY

The present application discloses embodiments that relate to a printing device searching and management system and method. In one aspect, the present application describes a method. The method includes causing a display device to display a search prompt into which a search input can be entered. The method also includes receiving, at a computing device, the search input comprising a plurality of characters. The method further includes determining a search condition based on a first portion of the plurality of characters. A given search condition is indicative of a criterion for a characteristic of a given printing device. Additionally, the method includes determining a command based on a second portion of the plurality of characters. A given command is indicative of an executable action. The given command specifies a given device on which to execute the action. The given command is executable in association with a printing device. Further, the method includes determining whether at least one printing device of a plurality of printing devices meets the criterion specified by the search condition. The method also includes identifying one or more printing devices that meet the criterion specified by the search condition based on determining that at least one printing device meets the criterion. The method further includes executing the determined command in association with at least one particular printing device from among the identified one or more printing devices on a device specified by the determined command.

In another aspect, the present disclosure describes a non-transitory computer-readable medium having instructions stored thereon that, upon execution by at least one processor, cause a computing device to perform a set of operations. The operations include causing a display device to display a search prompt into which a search input can be entered. The operations also include receiving, at a computing device, the search input comprising a plurality of characters. The operations further include determining a search condition based on a first portion of the plurality of characters. A given search condition is indicative of a criterion for a characteristic of a given printing device. Additionally, the operations include determining a command based on a second portion of the plurality of characters. A given command is indicative of an executable action. The given command specifies a given device on which to execute the action. The given command is executable in association with a printing device. Further, the operations include determining whether at least one printing device of a plurality of printing devices meets the criterion specified by the search condition. The operations also include identifying one or more printing devices that meet the criterion specified by the search condition based on determining that at least one printing device meets the criterion. The operations further include executing the determined command in association with at least one particular printing device from among the identified one or more printing devices on a device specified by the determined command.

In yet another aspect, the present application describes a system that includes a plurality of printing devices and a computing device. The computing device includes a display device and is configured to execute instructions. The instructions include sending a plurality of requests for printing device information (PDI) to the plurality of printing devices. A given PDI includes at least (i) a name of a given printing device and (ii) a value of a characteristic of the given printing device. The instructions also include receiving, from the plurality of printing devices, a respective plurality of PDIs. The instructions further include generating a printing device database based on the received plurality of PDIs. Additionally, the instructions include receiving a search condition indicative of a criterion for the characteristic of a given printing device. Further, the instructions include determining whether at least one printing device of the plurality of printing devices meets the criterion specified by the search condition. The instructions also include identifying one or more printing devices that meet the criterion specified by the search condition based on determining that at least one printing device meets the criterion. The instructions further include causing the display device to display the names of the identified one or more printing devices.

In another aspect, the present application describes a system. The system includes a means for causing a display device to display a search prompt into which a search input can be entered. The system also includes a means for receiving, at a computing device, the search input comprising a plurality of characters. The system further includes a means for determining a search condition based on a first portion of the plurality of characters. A given search condition is indicative of a criterion for a characteristic of a given printing device. Additionally, the system includes a means for determining a command based on a second portion of the plurality of characters. A given command is indicative of an executable action. The given command specifies a given device on which to execute the action. The given command is executable in association with a printing device. Further, the system includes a means for determining whether at least one printing device of a plurality of printing devices meets the criterion specified by the search condition. The system also includes a means for identifying one or more printing devices that meet the criterion specified by the search condition based on determining that at least one printing device meets the criterion. The system further includes a means for executing the determined command in association with at least one particular printing device from among the identified one or more printing devices on a device specified by the determined command.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
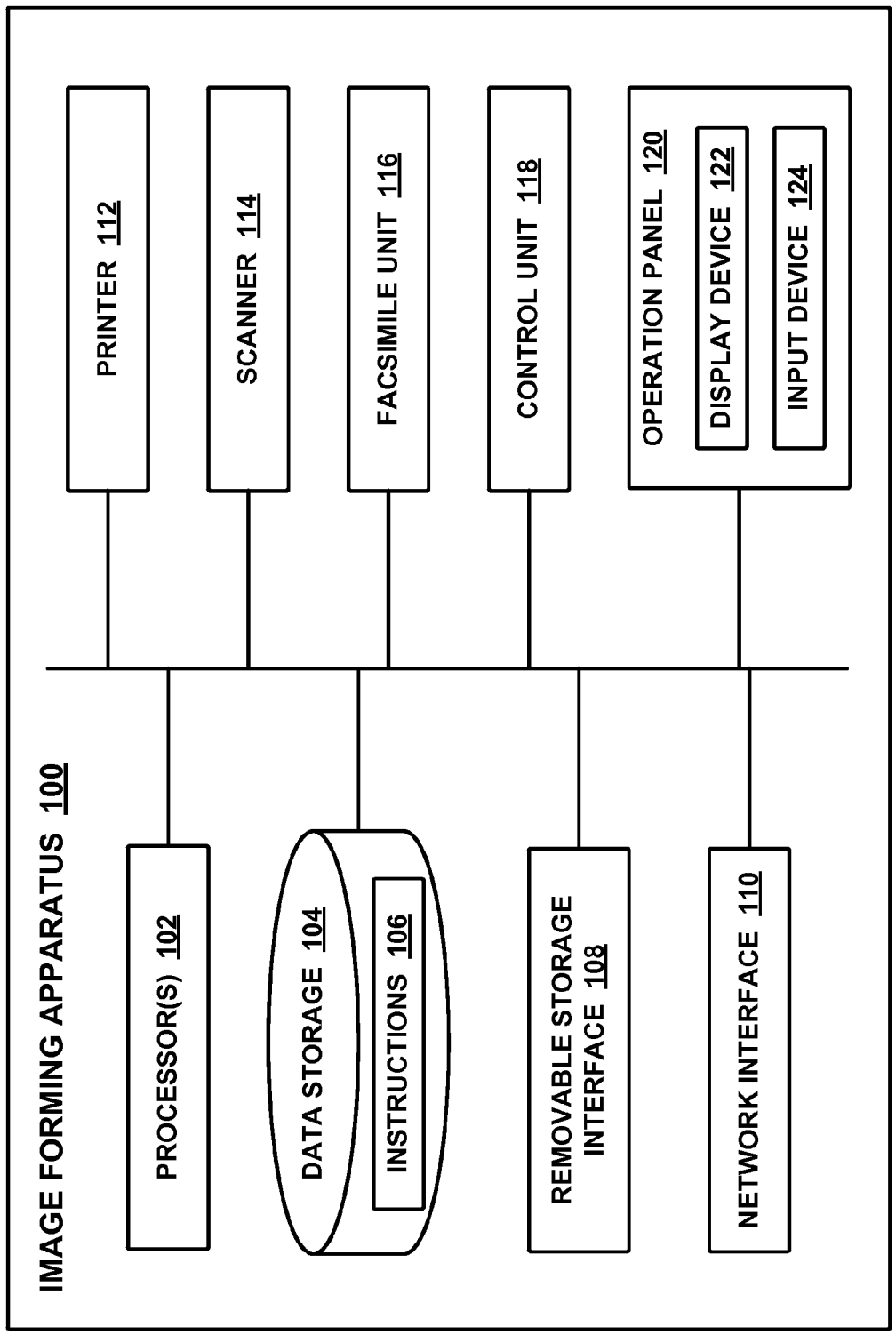
FIG. 1 is a schematic block diagram illustrating an image forming apparatus, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. Overview

An example embodiment is directed to a printing device searching and management system and method. Manually searching for a particular printing device within a network may be a difficult task. A computing device may, in some scenarios, have access to a list of printing devices on the network. However, such a list of printing devices usually depicts only basic information about those printing devices, such as administrator-designated names and model numbers. Often, a user must seek out an administrator or another user to determine the location of those printing devices and the capabilities of those printing devices. In some cases, a user may arbitrarily select a printing device based on its name and install a printer driver for that printing device to determine its capabilities; however, such a process may require some extent of trial-and-error before finding printer that suits the needs of the user.

A printing device searching and management system of the present application may provide a "universal" search box capable of performing a variety of tasks. The universal search box may allow a user to more quickly and efficiently search for printing devices within a network and/or execute commands in association with those printing devices. By employing language analysis techniques, such as those disclosed herein, the universal search box may find printing devices that match search criteria entered by a user. In some embodiments, a user may enter a search input into the universal search box in natural language, and the search box may analyze the search input and identify one or more search conditions from that search input. Thus, a user may search for printing devices having one or more characteristics specified by the search input in a single search operation.

The universal search box may, in addition to identifying search conditions, determine a command from a search input and execute that command. A user may enter into the universal search box a search input that includes both search conditions and a command. The command may be an operation to perform on a computing device, or may alternatively be an operation to perform on a printing device. When the command is performed on a computing device, executing the command may be done in association with a printing device. For example, a command to install a printer driver on a computing device, the printer driver may be associated with a particular printing device. In other cases, a command to change a printing device's operation panel keyboard may be performed on one or more printing devices.

Thus, the printing device searching and management system of the present application may provide a more quick and efficient manner of searching for printing devices and performing various operations in association with those devices. For example, a search input may find all printing devices on a network that have toner levels below 10%, which a serviceperson might use to identify which printing devices need to be serviced. As another example, a search input may set the language of the on-screen keyboard to English for all printing devices that have operation panels. In each of these examples, a single search input may be sufficient for performing the task.

It should be understood that any example search input and/or operation described herein are provided for explanatory purposes. Multiple search inputs may cause execution of the same operation. Example search inputs disclosed may not necessarily cause execution of an operation, depending upon the particular operation. The examples are provided to facilitate understanding of the printing device searching and management system of the present application and may not necessarily correspond to any particular implementation.

II. Example Image Forming Apparatus and Printing Device

FIG. 1 is a schematic block diagram of illustrating an image forming apparatus 100, according to an example embodiment. The image forming apparatus 100 includes processor(s) 102, data storage 104 that has stored thereon instructions 106, a removable storage interface 108, a network interface 110, a printer 112, a scanner 114, a facsimile (FAX) unit 116, a control unit 118, and an operation panel 120 that includes a display device 122 and an input device 124. Each unit of image forming apparatus 100 may be connected to a bus, allowing the units to interact with each other. For example, the processor(s) 102 may request information stored on data storage 104.

The processor(s) 102 may include one or more processors capable of executing instructions, such as instructions 106, that cause the image forming apparatus 100 to perform various operations. The processor(s) 102 may include general-purpose central processing units (CPUs) and cache memory. The processor(s) 102 may also incorporate processing units for specific purposes, such as application-specific integrated circuits (ASICs) and field-programmable gate arrays (FPGAs). Other processors may also be included for executing operations particular to image forming apparatus 100.

The data storage 104 may store thereon instructions 106, which are executable by the processor(s) 102. The data storage 104 may also store information for various programs and applications, as well as data specific to the image forming apparatus 100. For example, the data storage 104 may include data for running an operating system (OS). In addition, the data storage 104 may store user data that includes various kinds of information about any number of users. The data storage 104 may include both volatile memory and non-volatile memory. Volatile memory may include random-access memory (RAM). Some examples of non-volatile memory include read-only memory (ROM), flash memory, electrically erasable programmable read only memory (EEPROM), digital tape, a hard disk drive (HDD), and a solid-state drive (SSD). The data storage 104 may include any combination of readable and/or writable volatile memories and/or non-volatile memories, along with other possible memory devices.

The removable storage interface 108 may allow for connection of external data storage, which may then be provided to the processor(s) 102 and/or the control unit 118 or copied into data storage 104. The removable storage interface 108 may include a number of connection ports, plugs, and/or slots that allow for a physical connection of an external storage device. Some example removable storage devices that may interface with image forming apparatus 100 via the removable storage interface 108 include USB flash drives, secure-digital (SD) cards (including various shaped and/or sized SD cards), compact discs (CDs), digital video discs (DVDs), and other memory cards or optical storage media.

The network interface 110 allows the image forming apparatus 100 to connect to other devices over a network. The network interface 110 may connect to a local-area network (LAN) and/or a wide-area network (WAN), such as the Internet. The network interface may include an interface for a wired connection (e.g. Ethernet) and/or wireless connection (e.g. Wi-Fi) to a network. The network interface 110 may also communicate over other wireless protocols, such as Bluetooth, radio-frequency identification (RFID), near field communication (NFC), 3G cellular communication such as CDMA, EVDO, GSM/GPRS, or 4G cellular communication, such as WiMAX or LTE, among other wireless protocols. Additionally, the network interface 110 may communicate over a telephone landline. Any combination of wired and/or wireless network interfaces and protocols may be included in network interface 110.

The printer 112 may be any device or peripheral capable of producing persistent human-readable images and/or text on a printing medium, such as paper. The printer 112 may receive print data from other units of image forming apparatus 100 representing images and/or text for printing. The printer 112 may employ a variety of technologies, such as ink-based printing, toner-based printing, and thermal printing, among other technologies. An assortment of mechanical and/or electro-mechanical devices may make up the printer 112 to facilitate the transportation of printing media and the transferring of images and/or text onto the printing media. For example, the printer 112 may include trays for the storage and staging of printing media and rollers for conveying the printing media through the printer 112. The printer 112 may also include ink heads for dispensing ink onto a printing medium, photosensitive drums onto which lasers are shone to charge the drums and attract toner that is transferred onto a printing medium, and/or a thermal head for heating certain areas of a printing medium to generate images and/or text. Other devices may also be incorporated within printer 112.

The scanner 114 may be any device that can scan a document, image, or other object (which may collectively be referred to as "scanning medium" hereinafter) and produce a digital image representative of that scanning medium. The scanner 114 may emit light (e.g. via LEDs) onto the scanning medium and sense the light reflecting off the scanning medium (e.g. via a charge coupled device (CCD) line sensor or a complementary metal oxide semiconductor (CMOS) line sensor). In some implementations, the scanner 114 includes a platen glass onto which a document may be placed to be scanned. In addition, the scanner 114 may perform post-processing on the scanned image, such as rotation, compression of the data, and/or optical character recognition (OCR), among other post-processing operations.

The facsimile unit 116 may scan a document and/or images (which may be collectively referred to as "printed material" hereinafter) and transmit the scanned printed material over a telephone line (i.e. fax the scanned printed material). The facsimile unit 116 may fax the scanned printed material via the network interface 110. The facsimile unit 116 may also receive a fax transmission and communicate the received data to the printer 112 for printing. In some implementations, the facsimile unit 116 includes buttons for configuring the facsimile unit 116 and dialing a phone number and a display for displaying the status of the fax transmission, among other things.

The control unit 118 may control various electrical and/or mechanical components of the image forming apparatus 100. For example, the control unit 118 may operate one or more paper sheet feeders, conveyors, rollers, and other mechanical devices for transporting paper through the printer 112. The control unit 118 may also include device drivers that facilitate network communication, electronic displays, and the reading of information from various sensors or readers coupled to the image forming apparatus 100. In some implementations, the control unit 118 is a software application or program that interfaces the processor(s) 102 with the various units of the image forming apparatus 100.

The operation panel 120 includes a display device 122 and an input device 124 for facilitating human interaction with the image forming apparatus 100. The display device 122 may be any electronic video display, such as a liquid-crystal display (LCD). The input device 124 may include any combination of devices that allow users to input information into the operation panel 120, such as buttons, a keyboard, switches, and/or dials. In addition, the input device 124 may include a touch-screen digitizer overlaid onto the display device 122 that can sense touch and interact with the display device 112.

Figure 2:
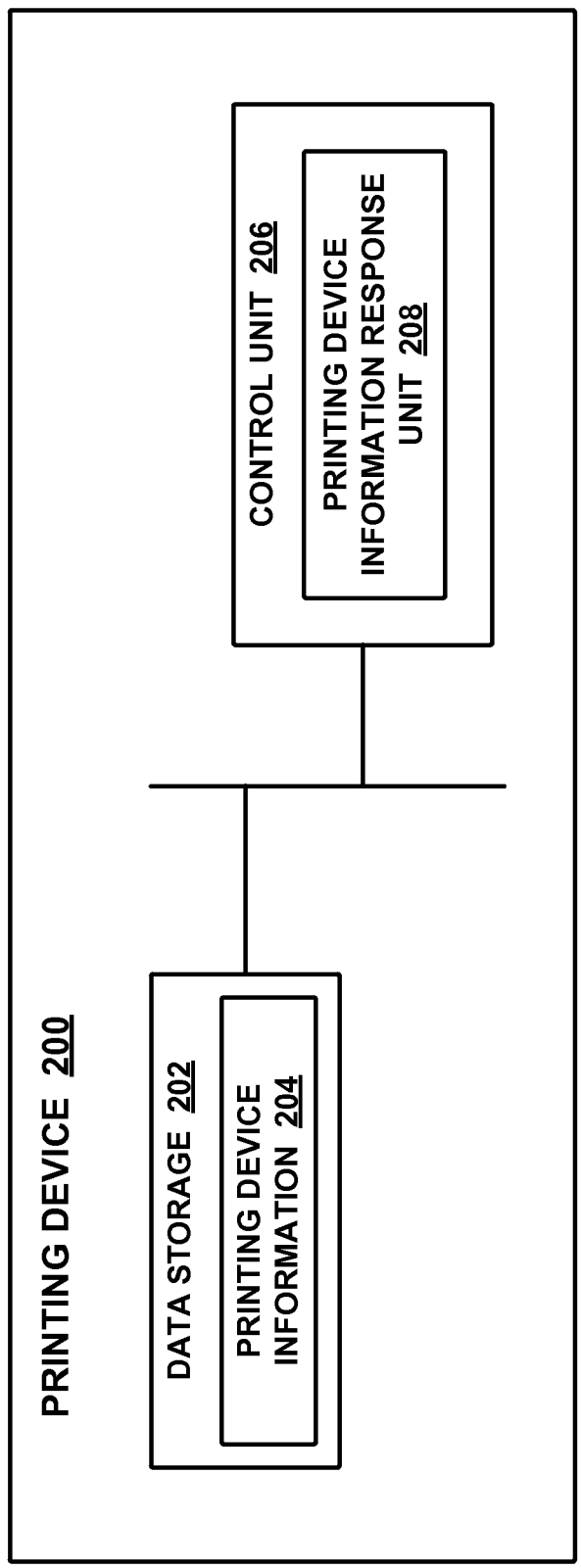
FIG. 2 is a schematic block diagram illustrates a printing device, according to an example embodiment.

FIG. 2 is a schematic block diagram illustrating a printing device 200, according to an example embodiment. The printing device 200 may, in addition to the units depicted in FIG. 2, include one or more of the units of image forming apparatus 100.

The data storage 202 may be a non-volatile storage device, such as a hard disk drive (HDD), solid state disk (SSD), or read-only memory (ROM). The data storage 202 may store unchanging information pertaining to the printing device 200, such as its model name, model number, serial number, and capabilities of the printing device 200. The data storage 202 may also store information about the state of the printing device 200, such as its current IP address, a user-designated name of the printing device 200, customer information, toner/ink levels, paper levels, and whether or not the printing device is busy. Any of the previously described information may be encompassed within printing device information (PDI) 204. Certain pieces of information, such as the toner/ink or paper levels may be updated either periodically or in response to an operation being performed on the printing device 200.

The control unit 206 may be any combination of software and/or hardware that executes operations on the printing device 200. The control unit 206 may include printing device information response unit 208, among other possible units or software modules. The printing device information response unit 208 may receive a request for PDI 204 from a computing device and responsively transmit a response to the computing device containing a copy of the PDI 204. The control unit 206 may access the PDI 204 from the data storage 202. In some embodiments, the control unit 206 may also update the PDI 204 on the data storage 202 prior to transmitting a copy of the PDI 204 to a requesting computing device.

A "unit" as referred to herein may refer to a device, component, module, or other combination of electrical and/or mechanical elements that accomplish a particular task. In some instances, a unit may refer to a physical device that performs certain activities, such as the facsimile unit 116. In other instances, a unit may refer to a software module that executes operations for a certain purpose, such as the printing device information response unit 208. Regardless of the combination of hardware and software components that make up a unit, it should be understood that units are operable to accomplish certain tasks, and may interact with other units through hardware and/or software interfaces.

Printing devices and image forming apparatuses referred to herein may incorporate any combination of components from image forming apparatus 100 and/or printing device 200, among other possible components. For instance, an image forming apparatus may include a power supply that converts electrical power for use by various components. It should be understood that other additional components might also be included on a particular image forming apparatus.

III. Example Computing Device

Figure 3:
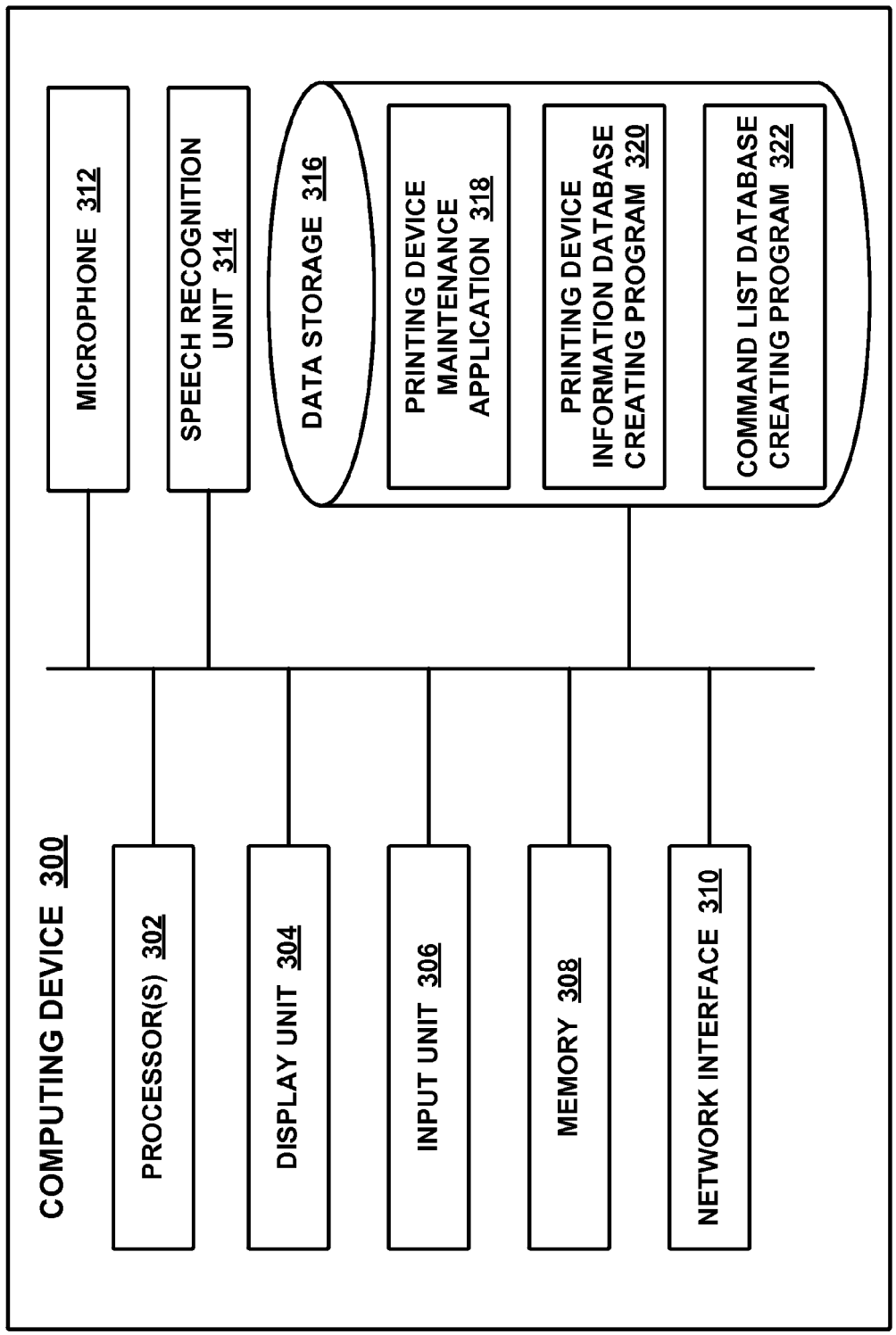
FIG. 3 is a schematic block diagram illustrates a computing device, according to an example embodiment.

FIG. 3 is a schematic block diagram illustrates a computing device 300, according to an example embodiment. The computing device 300 includes processor(s) 302, a display unit 304, an input unit 306, a memory 308, a network interface 310, a microphone 312, a speech recognition unit 314, and data storage 316. Each unit of computing device 300 may be connected to a bus, allowing the units to interact with each other.

The processor(s) 302 may include one or more processors capable of executing applications and/or programs stored on data storage 316. The processor(s) 302 may include general-purpose central processing units (CPUs) and cache memory. The processor(s) 302 may also incorporate processing units for specific purposes, such as application-specific integrated circuits (ASICs) and field-programmable gate arrays (FPGAs). Other processors may also be included for executing operations particular to image forming apparatus 300.

The display unit 304 may be any kind of device capable of displaying human-readable text and/or graphics. The display unit 304 may, for example, display a user interface with which a user may perform searches for printing devices and/or execute commands in association with printing devices. The display unit 304 may, for example, display search boxes, prompts, and/or search results. Some example display units include a liquid crystal display (LCD), a light-emitting diode (LED) display, a plasma display, or a cathode ray tube (CRT), among other possible display technologies. Regardless of the kind of display used, the display unit 304 is an output device that can display information and user interfaces of the present application.

The input unit 306 may be any kind of human interface device (HID) that receives input from a user and translates that input into computer-understandable information. Some example input units include a keyboard, a mouse, a touchpad, and/or a touchscreen, among other possible input devices. In some instances, the input unit 306 may refer to an on-screen keyboard or pointer device of a touchscreen. A user may interact with input unit 306 to enter a search input and/or select a desired printing device with which to associate a command. Regardless of the kind of input device used, the input unit 306 may provide an interface through which a user can interact with a printing device searching system, application, or program of the present application.

The memory 308 may be a volatile memory, such as RAM. The memory 308 may be used as a temporary storage location used by applications and/or programs of the computing device 300.

The network interface 310 may be a wired and/or wireless communication interface that allows the computing device to connect to and communicate over a network. The network interface 310 may be utilized by applications and/or programs of the present application to retrieve information—such as PDI—from one or more printing devices. The computing device 300 may also communicate with a server to access and modify a command database and/or printing device database stored on the server.

The microphone 312 may be a recording device capable of capturing sounds and/or a user's voice. The microphone 312 may capture audio segments of a user speaking one or more words. Such recorded audio may be stored on the memory 308 and/or the data storage 316. In some embodiments, audio segments recorded by the microphone 312 may be provided to the speech recognition unit 314 to be analyzed and transcribed.

The speech recognition unit 314 may be any combination of software and/or hardware components that determines one or more words spoken by a user from an audio segment captured by the microphone 312. The speech recognition unit 314 may employ various speech recognition techniques in order to transcribe a user's speech into words. The transcribed words may then be provided to the printing device maintenance application 318 and used as a search input.

In some embodiments, the printing device maintenance application 318 utilizes the speech recognition unit to allow a user to perform speech-to-text search input. The printing device maintenance application 318 may display a button or other graphical element that, when selected, activates the microphone 312 and begins recording the speech of a user. The printing device maintenance application 318 may then employ the speech recognition unit 314 to identify words spoken by the user and transcribe them into a text string, which is entered into a search box as a search input.

In some implementations, the speech recognition unit 314 may utilize a full dictionary when performing the transcription. In other implementations, the speech recognition unit 314 may utilize a more narrowed specific dictionary that includes known commands, command names, and/or expected search conditions. The speech recognition unit 314 may be configured to identify speech of a certain kind of language, or of multiple languages simultaneously.

In some implementations, the speech recognition unit 314 may provide recorded speech to a web service that facilitates the transcription. Thus, the speech recognition unit 314 may be connected to the network interface 310 to access such a web service over a wide area network, such as the Internet. In other implementations, the speech recognition unit may be a specialized speech recognition tool designed to interpret speech using the above-described specific dictionary, which may not necessarily require network access or external services.

The data storage 316 may store thereon applications and/or programs that perform operations of the present application. The applications and programs may include a collection of operations that perform a certain task. Some examples kinds of data storage include read-only memory (ROM), flash memory, electrically erasable programmable read only memory (EEPROM), digital tape, a hard disk drive (HDD), and a solid-state drive (SSD).

The printing device maintenance application 318 may perform operations for displaying a user interface, searching for printing devices, and executing commands in association with a printing device. The printing device maintenance application 318 may be capable of executing commands on either the computing device or on a particular printing device. For example, in response to an "Install Driver" command associated with a particular printing device being entered, the printing device maintenance application 318 may install a driver for that particular printing device onto the computing device (i.e. the install driver command is executed on the computing device). As another example, in response to a "keyboard setting" command being entered, the type of on-screen keyboard displayed on an operation panel of a particular printing device may be changed (i.e. the keyboard setting command is executed on that particular printing device).

The user interface of printing device maintenance application 318 may display information pertaining to one or more printing devices within a network. The printing device maintenance application 318 may display a search box into which a search input may be entered. The user interface displayed by printing device maintenance application 318 may update in response to a search input being entered and a search being run. The printing device maintenance application 318 may also display prompts requesting subsequent input depending upon the particular search input that is entered.

In some embodiments, the search box of printing device maintenance application 318 may be a "universal" search box. For the purposes of this application, the "universal" search box is multi-functional, and may be capable of parsing and understanding natural language to identify search conditions and/or commands from the entered text. In some embodiments, the universal search box may be "intelligent"; in other words, it may be capable of interpreting search inputs that contain extraneous words, spelling mistakes, or are otherwise imperfect search strings.

Furthermore, the search box of the present application may implement logical Boolean operations that logically narrow search results using Boolean operators. For instance, two search conditions "ppm>60" and "duplex printing" combined with an "AND" represents a search input for printing devices that can both print faster than 60 pages per minute and are capable of duplex printing. Such a logically narrowed search might be more efficient in finding a fast, full-featured printer. As another example, two search conditions "toner<5%" and "paper<10%" combined with an "OR" represents a search input for printing devices that have either toner levels of less than 5% or paper levels of less than 10%. Such a broadened search might be preferred for a serviceperson that wants to identify all printing devices that require immediate attention, without having to run multiple searches.

In some instances, the printing device maintenance application 318 may identify a portion of the search input entered into the above-described search box as possibly being indicative of two or more commands. This may occur if the printing device maintenance application 318 determines a portion of the search input as the command portion, then subsequently determines that the command portion is substantially similar to two or more commands. In some implementations, the command portion may be considered "substantially similar" to a known command when it is compared to that known command and has an extent of similarity that exceeds a threshold similarity. Such a comparison may utilize approximate string matching techniques or other kinds of quantifiable string comparison techniques. Regardless of the particular implementation, the printing device maintenance application 318 may display a prompt including the substantially similar commands requesting selection of the intended command.

Figure 7:
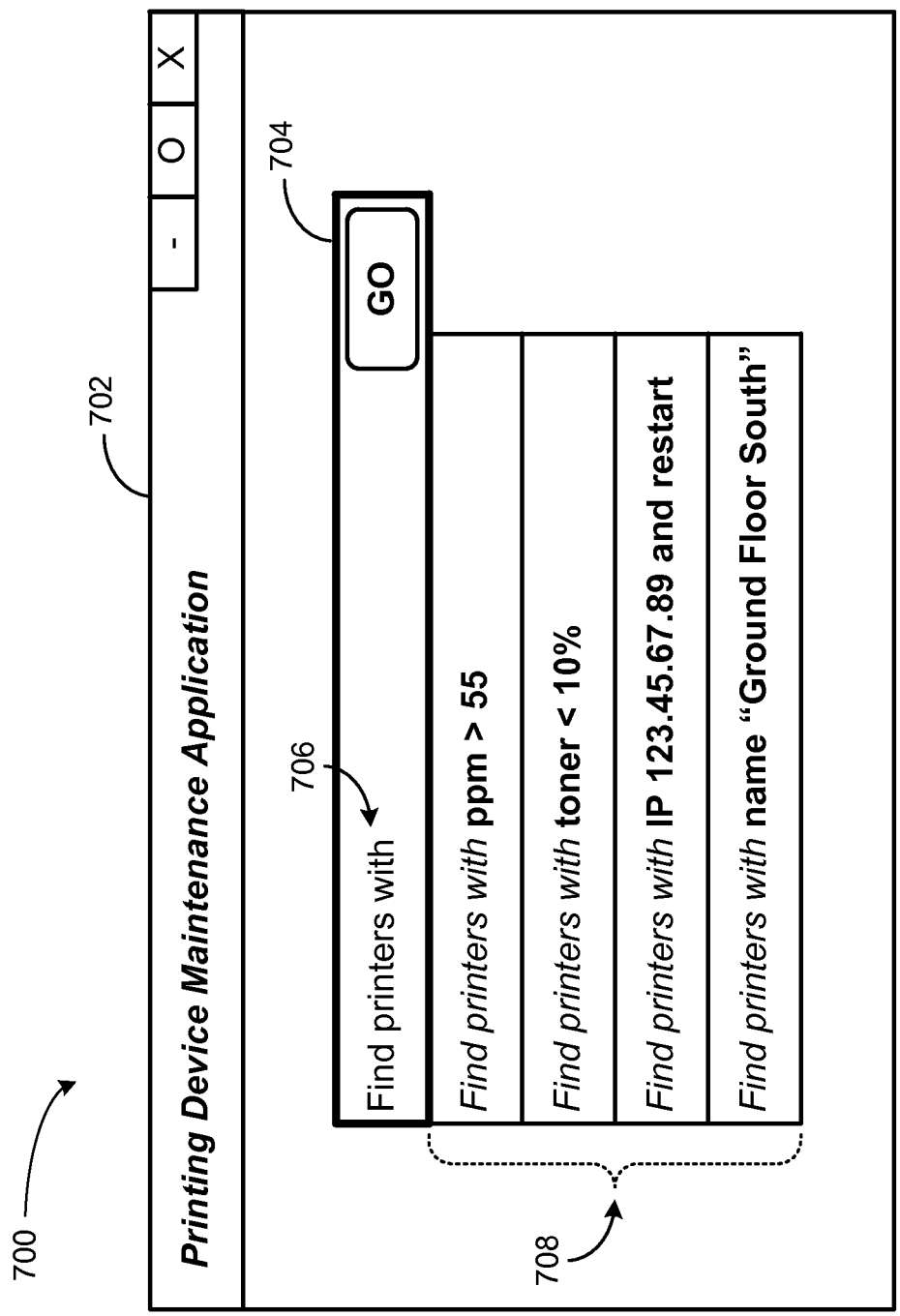
FIG. 7 is a representation of an example search box, according to an example embodiment.

In some embodiments, the printing device maintenance application 318 may display a search input history from which a previously-entered search input can be selected. If a large number of searches have been previously input, the search input history displayed may be a small portion of the previously-entered search inputs (e.g. 3-10 of the most recently entered search inputs) may be displayed. The search input history may be displayed, for example, beneath the search box. If a previously-entered search input is selected, the search box may be populated with that search input, which can then be modified by a user. In alternative implementations, selecting a previously-entered search input may cause the printing device maintenance application 318 to perform the search using that search input. An example representation of displayed previously-entered search inputs is depicted in FIG. 7, which is described in more detail below.

Figure 6:
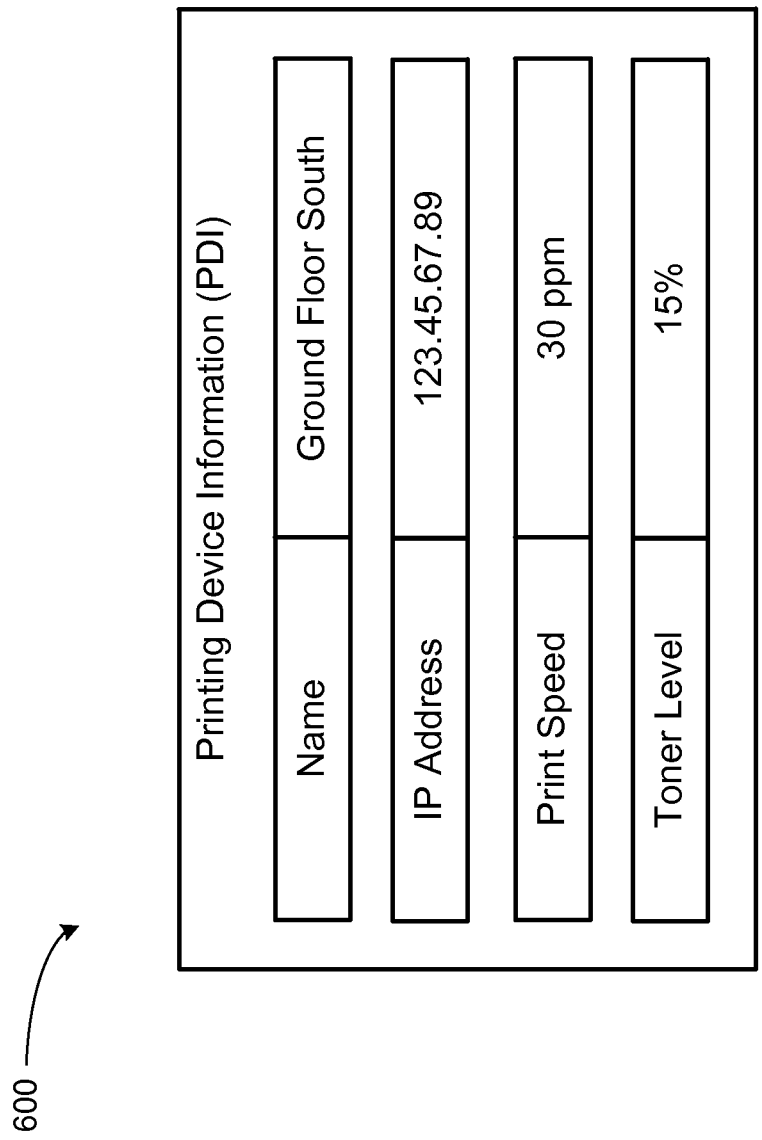
FIG. 6 is a representation of an example printing device information (PDI), according to an example embodiment.

The printing device information database creating program 320 may perform operations for generating a printing device information (PDI) database. In some instances, when no PDI database exists, the PDI database creating program 320 may execute a number of initialization operations in order to create a PDI database. The initialization operations may include operations depicted in FIG. 7. Generally, the initialization operations may involve requesting PDI from one or more printing devices, responsively receiving PDI for those printing devices, and then generating a table with the received PDI. An example PDI is depicted in FIG. 6.

The PDI database creating program 320 may also include operations for updating the PDI database. The PDI database creating program 320 may receive PDI from a printing device that already exists within the PDI database. In some instances, the PDI database creating program 320 may replace portions of the PDI in the database associated with that particular printing device in order to update its information. For example, PDI might include therein information about the toner level of the particular printing device. Over time, that toner level may change; in such instances, the PDI database creating program 320 may retrieve the latest toner level for a particular printing device and update that toner level within the PDI database. A PDI database update may also involve retrieving the latest toner levels for each color of toner, paper levels, and IP address, among other information about the state of the printing device.

In some embodiments, the PDI database may be stored on the computing device 300. In other embodiments, the PDI database is stored on a server, and the computing device 300 requests a copy of that PDI database. In additional embodiments, the PDI database is stored on a server, and the computing device 300 transmits query requests to the server to retrieve information from the PDI database and/or update entries within the PDI database.

In some implementations, the functionality of the PDI database creating program 320 may be utilized by or executed in conjunction with the printing device maintenance application 318. For example, the printing device maintenance application 318 may provide input options (via a designated button or by entering a certain command into the universal search box) to create and/or update the PDI database.

Figure 5:
FIG. 5 is a representation of an example command database, according to an example embodiment.

The command list database creating program 322 may perform operations for generating and/or updating a command list database. A command list database may store information about a set of commands that can be executed on either the computing device or on a particular printing device. An example command list database is depicted in FIG. 5.

In some implementations, the command list database contains a series of entries. Each entry may contain a unique command ID, the static command name (i.e. a "hard-coded" name designated by, for example, a programmer) and user-assigned command names in one or more languages. Each entry may also indicate the device on which the associated command can be executed. For instance, an entry of "Install Driver" may include a flag, bit, or kind of data indicating that the "install_driver" command is executable on a computing device. Additionally, such a command like "install_driver" may be executed in association with a particular printing device; in this example, the driver to install is the driver for the particular printing device. Thus, a given command may either be executed on the computing device in association with a printing device, or on a particular printing device itself. A given entry may include information stored therein indicating the manner in which the associated command may be executed.

The command list database creating program 322 may also be updated in response to a user input that specifies setting or replacing a user-assigned command name. As one example, a user may designate a "restart" command that cycles the power on a printing device as "Reboot." Alternatively, a different user may designate the "restart" command as "cycle power." In yet another example, a user that speaks Japanese may prefer to assign the "restart" command name as "Saikidō." The command list database creating program 322 may store multiple user-assigned names for each command in any number of languages.

The command list database may, in some embodiments, be associated with a particular user. Thus, any user-assigned commands names may be unique to that particular user. This may be beneficial if different users prefer different terminologies, or if different users prefer different languages.

In some embodiments, the command list database may be stored on the computing device 300. In other embodiments, the command list database is stored on a server, and the computing device 300 requests a copy of that command list database. In additional embodiments, the command list database is stored on a server, and the computing device 300 transmits query requests to the server to retrieve information from the command list database and/or update entries within the command list database.

In some implementations, the functionality of the command list database creating program 322 may be utilized by or executed in conjunction with the printing device maintenance application 318. For example, the printing device maintenance application 318 may provide input options (via a designated button or by entering a certain command into the universal search box) to create and/or update the command list database.

IV. Example Systems

Figure 4:
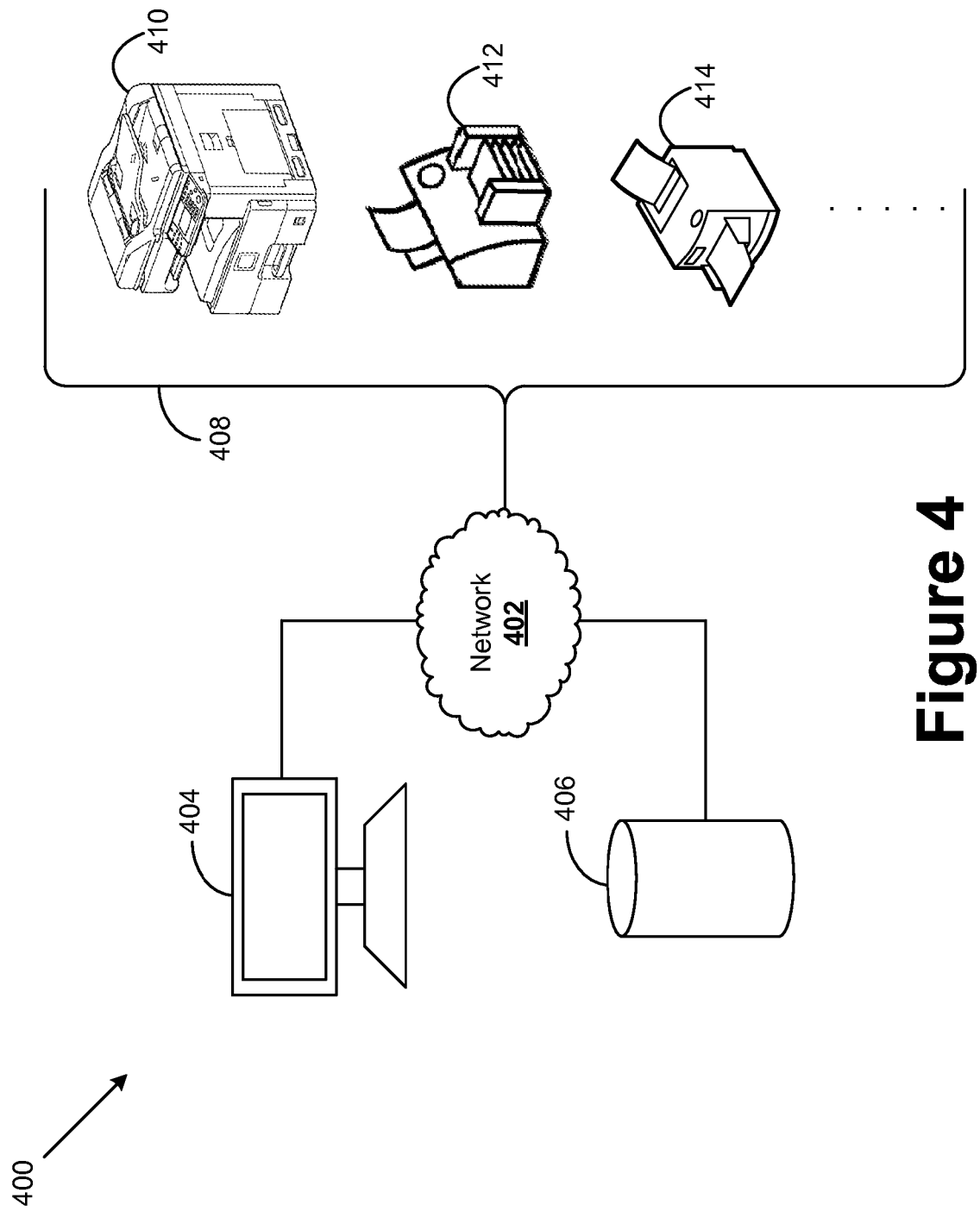
FIG. 4 is a schematic block diagram of a system, according to an example embodiment.

FIG. 4 is a schematic block diagram of a system 400, according to an example embodiment. The system 400 is an example system that includes a network 402 that communicatively connects computing device 404, server 406, and a group of printing devices 408. The group of printing devices 408 may include any combination of printing devices, including multi-function peripheral (MFP) 410.

The network 402 may be a local area network, a wide area network, or a combination thereof. In some embodiments, the computing device 404 and the printing devices 408 may all be connected to the same local area network. In another embodiment, the computing device 404 is a remote computing device that connects to one or more peripheral devices 408 over a wide area network, such as the Internet. It should be understood that the network 402 may be any type of network communication medium through which the devices within system 400 may communicate, transmit, and/or receive information.

The computing device 404 may be any computing device capable of sending information to one or more of the printing devices 408 and processing information received from one or more of the peripheral devices 408. The computing device 404 may include one or more units of computing device 300. The computing device 404 may perform various operations of the printing device searching and management techniques described herein. In some implementations, the computing device 404 includes an input device into which a search input may be entered and a display device on which search results may be displayed. Although the computing device 404 is depicted as a desktop computer, the computing device 404 may be a server, a laptop computer, a tablet, a smart phone, or another mobile computing device.

The server 406 may be any computing device capable of storing information, such as a command list database and a PDI database. The server 406 may receive requests for information (i.e. queries) stored thereon from the computing device 404 and transmit a response back to the computing device 404. The server 406 may be connected to network 402 and accessible by the computing device 404.

In some embodiments, the computing device 404 running the printing device maintenance application 318 may request information from the server 406. Such a request or query may include text or other information with which to search one or more databases on server 406. In some instances, this text may be a portion of an entered search input, a corrected version of an imperfect search input, or tokenized or encoded information representative of search conditions or commands.

For instance, the server 406 may be queried by computing device 404 with "set keyboard" and request a command name and/or command ID associated with "set keyboard." The server 406—which, for this example, has stored thereon the command list database 500 illustrated in FIG. 5—may locate the search entry for command ID "0000" with the command name "keyboard_setting". This command name may, for example, be associated with a method or function name of the printing device maintenance application 318. The server 406 may then responsively transmit that command ID and/or command name back to the computing device 404.

In some embodiments, the server 406 may store a history of entered search inputs. Upon completion of a search, the computing device 404 may transmit the search input to server 406 to add that search input to the stored history of search inputs (i.e. list of previously-entered search inputs). During operation, the computing device 404 running the printing device maintenance application 318 may allow a user to view the search input history and possibly select one of the previously-entered search inputs to run again.

The group of printing devices 408 may include any combination of printing devices. FIG. 4 illustrates the group printing devices 408 as including MFP 410, printing device 412, and printing device 414. Any variety of printing devices and MFPs may be included within the group of printing devices 408. In some cases, multiple printing devices of the same model may exist within the group of printing devices 408. In some instances, the group of printing devices 408 may be associated with a company, a particular office of that company, or a floor within such an office, to name a few examples. In other instances, the group of printing devices 408 may be all printing devices of a particular model in operation. Any other combination of devices may be included within the group of printing devices 408.

The MFP 410 may be any kind of multi-function peripheral. The MFP, in some implementations, may be similar to or the same as image forming apparatus 100. In some embodiments, the MFP 410 may have operation panel that includes a display device and/or an input device. An input device may be any device into which a search input may be entered, such as a physical keyboard, a virtual keyboard, a mouse, or a touch-screen digitizer. A display device may be any device on which search results may be displayed, such as a liquid crystal display (LCD).

It should be understood that the system 400 is an example system that is provided for explanatory purposes. Any number of mobile devices, computers, laptops, or other mobile devices may be present and connected to the system 400 in a variety of ways.

V. Example Command Database

FIG. 5 is a representation of an example command database 500, according to an example embodiment. The command database 500 depicts three command entries: "keyboard_setting," "install_driver," and "restart." In some embodiments, these commands represent method or function names that execute a certain operation within the printing device maintenance application. Each of these commands may be associated with an ID number.

Each command entry may have one or more names assigned thereto. For example, the "keyboard_setting" command may have an assigned English name of "Set Keyboard" and an assigned Japanese name of "Kībōdo settei". During operation, a search input may include one of these assigned names, indicating a user wishes to perform a certain command. However, instead of requiring a user to memorize programmed function or method names of the printing device maintenance application 318, a user may enter a more natural search input in the language that they are most comfortable with. Accordingly, when a user enters one of the assigned command names, the printing device maintenance application 318 may query the command database 500 with that name to search for the corresponding command. Once a matching command is found, the command and/or the command ID may be provided to the printing device maintenance application 318, which may utilize either the command or the command ID to invoke the corresponding method or function.

Entry of certain commands may invoke the printing device maintenance application 318 to prompt a user for additional information. For example, executing command "keyboard_setting" may cause a prompt to display that requests whether the user wishes to either change the keyboard layout on a printing device's operation panel or to change the keyboard language on the printing device's operation panel. The prompt may include two or more selectable buttons corresponding to each option. Alternatively, a user may enter in text indicative of the user's desired option.

Assigned names of a given entry may be changed or overwritten by a user. In some instances, a search input entered into a search box may represent a user requesting modification of one of the entries. As one possible example, a search input of "replace Install Driver with Load Driver" may replace the assigned English name of entry ID "0001" from "Install Driver" to "Load Driver." Such an operation may apply to all users accessing the command database 500, or only to the particular user performing the modification operation. In some embodiments, the command list database may be displayed graphically, and a user may edit assigned command names manually.

VI. Example Printer Device Information

FIG. 6 is a representation of an example printing device information (PDI) 600, according to an example embodiment. PDI 600 includes four fields: the name, IP address, print speed, and toner level. The PDI 600 may be associated with a printing device, such as printing device 200. Each of these fields may be herein referred to as "characteristics," and the printer-specific information associated with each characteristic may be herein referred to the "value" of that characteristic.

In the example shown in FIG. 6, the name of the printing device is "Ground Floor South," which may indicate that it is located on the ground floor and on the south side of an office. The name may be assigned by a user or an administrator to describe the printing device.

The IP address may be IP address assigned to the printing device within the local network that can be utilized by, for example, the printing device maintenance application 318 in order to establish a network connection between a computing device and the printing device with that IP address. After the network connection has been established, the computing device may transmit commands and other information for executing various actions on the printing device.

The print speed may be a hard-coded rate at which the printing device is capable of printing pages. In this example, "30 ppm" indicates that the printing device is capable of printing at a rate of thirty pages per minute. Note that, in some implementations, the PDI may not store that information as a text string, but instead as an integer (where "ppm" units are understood).

The toner level may represent a percentage of toner that is remaining in the printing device. In this example, "15%" indicates that fifteen percent of the toner is remaining. This toner level may be updated periodically and/or in response to receiving a request for PDI, to ensure that the toner level is current. Note that other kinds of printing materials, such as ink, may be included within the PDI depending upon the particular printing device.

It should be understood that the PDI 600 shown in FIG. 6 is merely an example representation of PDI with example fields and information. PDI as described in the present application may include a variety of other kinds of information, such as toner levels for each color of toner, printing device model information, a serial number, MAC address, and/or information about the capabilities of the printing device.

VII. Example Search Box

FIG. 7 is a representation 700 of an example search box 704, according to an example embodiment. A user interface 702 for the printing device maintenance application is shown in FIG. 7. The user interface 702 includes a search box 704. A partially entered search input 706 is shown in the search box 704. In the example illustration of FIG. 7, the printing device maintenance application is displaying previously-entered search inputs 708.

In an example operation, a user may enter in the search input 706 "Find printers with" using a keyboard or other input device, which is displayed within the search box 704. Upon receiving an entry of the partial search input 706, the printing device maintenance application may, based on a stored search input history, display previously-entered search inputs 708. As shown in FIG. 7, the previously-entered search inputs 708 may, in some embodiments, be previous search inputs that contain the partially entered search input 706. In this example, the previously-entered search inputs 708 that are displayed all begin with "Find printers with" and also include a search condition and/or command. For example, one of the previously-entered search inputs 708 is "Find printers with ppm>55", where "ppm>55" is a search condition indicating that the search is for printers capable of printing at a rate faster than 55 pages-per-minute. As another example, the previously-entered search input "Find printers with IP 123.45.67.89 and restart" instructs the printing device maintenance application 702 to find the printer with the IP address of "123.45.67.89"—such as the printer represented by PDI 600—and cause that particular printer to restart. A user may select one of the previously-entered search inputs 708 to be executed by the printing device maintenance application.

In some embodiments, a computing device running the printing device maintenance application may store search inputs after they have been run. These search inputs may be logged on a table or database, which may be stored on a storage device of the computing device, for example. The printing device maintenance application may use these stored previously-entered search inputs as a basis for displaying previously-entered search inputs 708.

In some cases, no search input 706 may be entered. In these cases, the previously-entered search inputs 708 may be the most recently entered search inputs. In some implementations, the previously-entered search inputs 708 may be the most frequently entered search inputs. It should be understood that any combination of logic, filtering, and analysis may be performed in order to determine which stored search inputs should be displayed.

The search box 704 may, in some embodiments, provide suggested completions of partially entered searches, similarly to the example depicted in FIG. 7. Such example embodiments may be referred to as "auto-completion." The previously-entered search inputs 708 may automatically appear upon entering of partial search input 706. In some implementations, a button or other graphical control element may be provided that, when pressed or otherwise activated, causes the previously-entered search inputs 708 to be displayed.

It should be understood that the printing device maintenance application user interface 702, search box 704, partial search input 706, and previously-entered search inputs 708 depicted in FIG. 7 are example graphical depictions provided for explanatory purposes. The relative sizes, shapes, fonts, and other graphical properties of the user interface 702 may vary depending upon the particular implementation.

VIII. Example Methods

Figure 8:
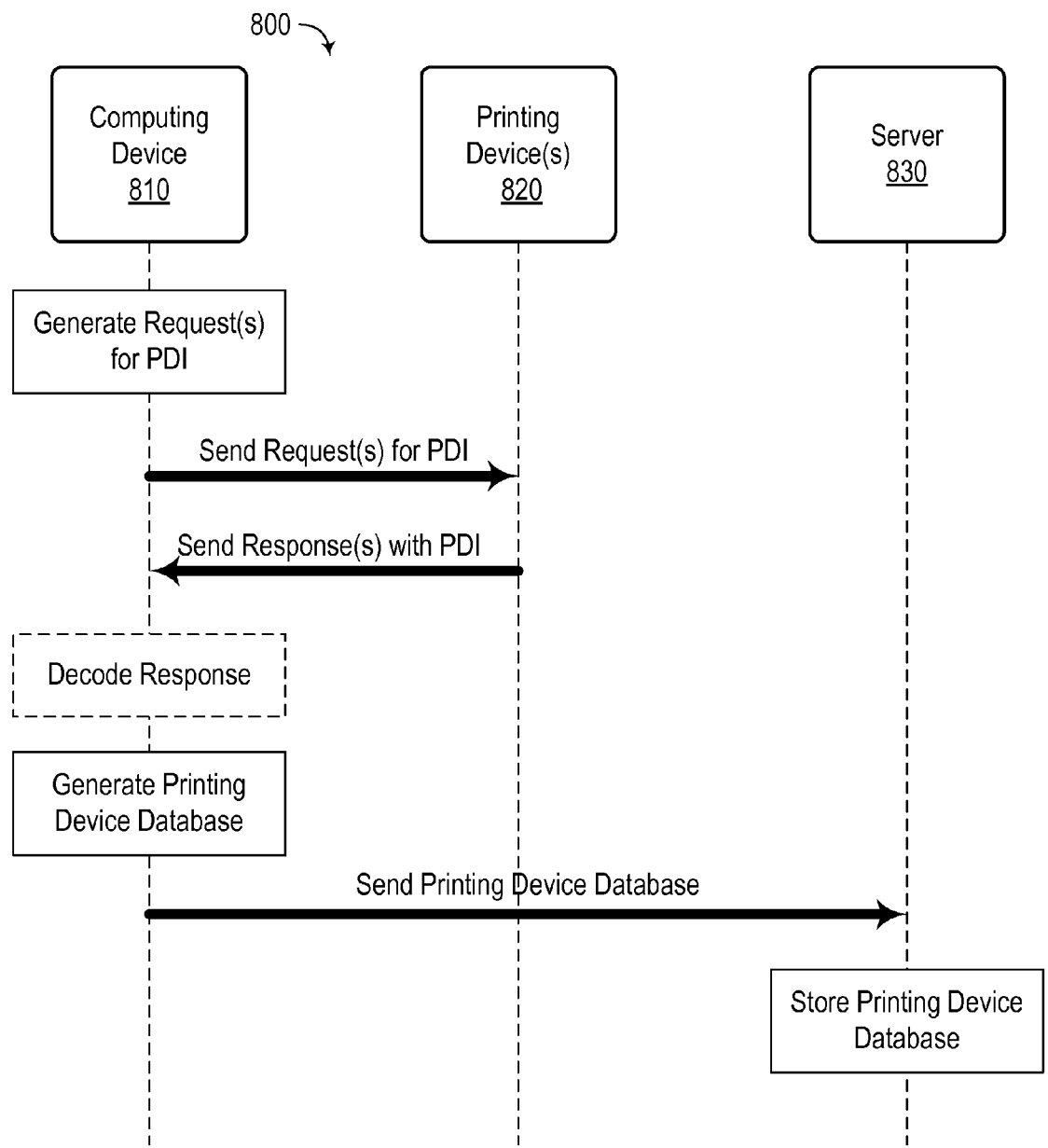
FIG. 8 is a data flow diagram illustrating an example method, according to an example embodiment.

FIG. 8 is a data flow diagram 800 illustrating an example method, according to an example embodiment. The data flow diagram 800 depicts information passing among the computing device 810, printing device(s) 820, and server 830. More specifically, the data flow diagram 800 depicts a process through printing device information (PDI) is retrieved and stored. Note that the data flow diagram 800 is merely depicts an example of data flow among the devices in the system; in various implementations, fewer or additional devices may be present and fewer or additional steps may be performed different from those depicted in FIG. 8 to accomplish the print data retrieval disclosed in the present application.

Note that computing device 810 may be similar to or the same as computing device 300. Additionally, printing device (s) 820 may include one or more units from image forming apparatus 100 and/or printing device 200. For the purposes of the following explanation, printing device(s) 820 includes two or more printing devices, and is referred to in a plural form. It should be understood that a single PDI may be passed through the system as well.

First, the computing device 810 generates requests for PDI. The requests may be a message (e.g. an SNMP message, WSDL message, etc.) indicating that the computing device is requesting a copy of the PDI stored on each respective printing device of the printing devices 820.

Then, the computing device 810 sends the requests for PDI the printing devices 820. The requests may be sent over a local area network, a wide area network, or a combination thereof.

Then, in response to receiving the requests for PDI from the computing device 810, the printing devices 820 send responses with PDI back to the computing device 810. Each printing device may have local storage on which its PDI is stored. The response sent by each printing device may include a copy of such a stored PDI.

Then, in some embodiments, the PDI responses are decoded. The PDI may be encoded—that is, represented by a stream of numbers or bits—which require decoding in order to understand the information being transmitted. The computing device 810 may be aware of a messaging scheme and may utilize, for example, a library file that describes the expected message format. The computing device may use this information in order to decode the PDI. In other embodiments, the PDI is encrypted using a passcode or a key, and the computing device decrypts the encrypted PDI using the same passcode or corresponding key.

Then, the computing device 810 generates a printing device database. This operation may involve assembling the received (and possibly decoded) PDI responses into a PDI table or database. Each response may be used to create an entry in the database, and may also be assigned a unique identifier.

Then, the computing device 810 sends the printing device database to the server 830. The server may store a copy of this printing device database on a non-transitory storage medium.

Upon receiving the printing device database from the computing device 810, the server 830 stores a copy of that printing device database. The computing device 810 may query information from the stored printing device database thereafter.

It should be understood that, although the operations in FIG. 8 appear to be performed in a particular order, the steps may be performed in a different order and/or certain steps may be performed simultaneously with other steps. The order of the operations depicted in FIG. 8 are provided for explanatory purposes.

Figure 9:
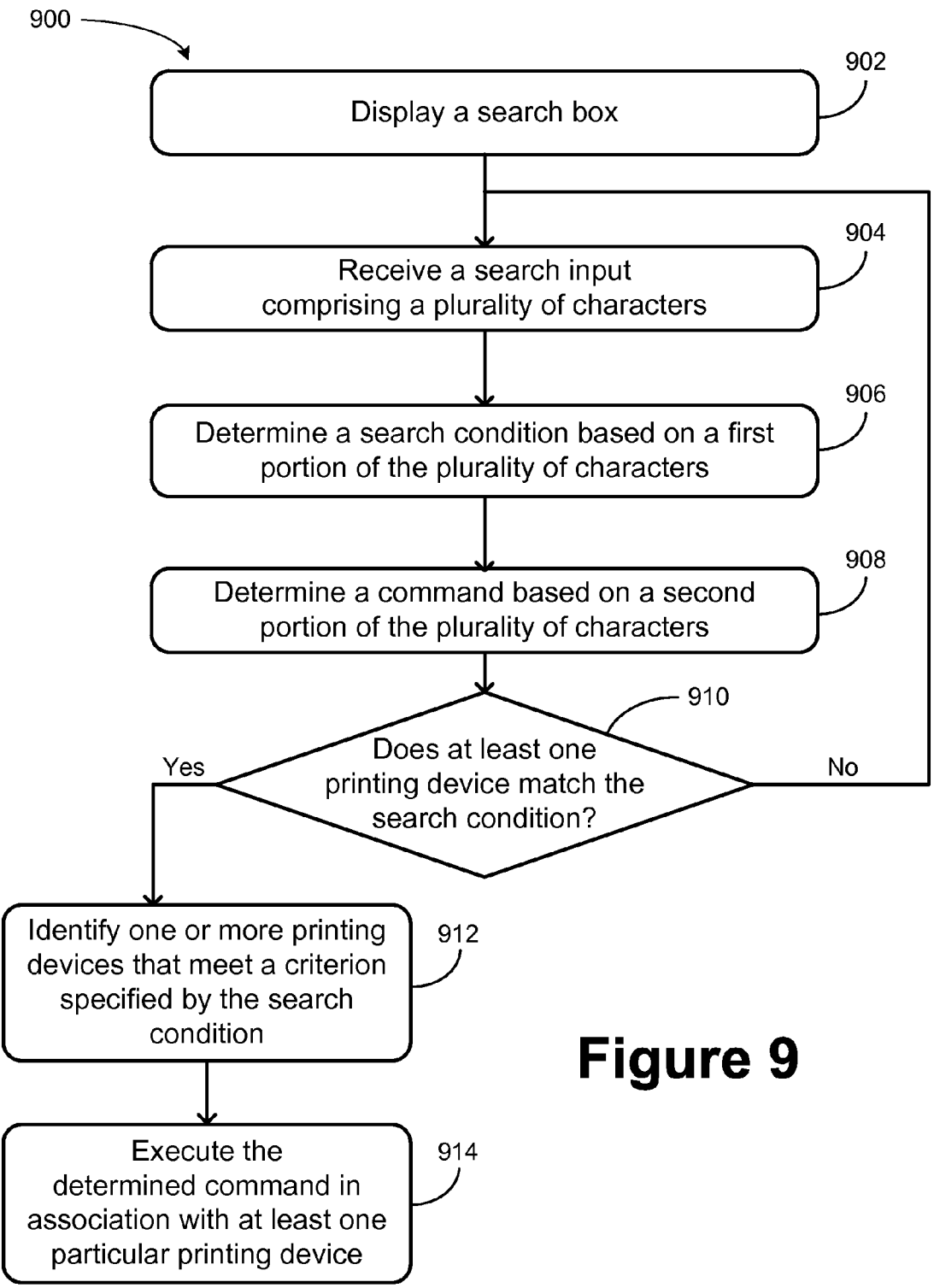
FIG. 9 is a flowchart illustrating a method, according to an example embodiment.

FIG. 9 is a flowchart illustrating a method 900, according to an example embodiment. The method 900 may be one example set of operations that collectively performs printing device searching and management of the present application. Operations of method 900 may be performed on one or more devices in the system 400 shown in FIG. 4, such as computing device 404.

At step 902, the method 900 involves displaying a search box. As described above, the search box may be a universal search into which search inputs may be input. The search box may be displayed as a rectangular graphical user interface element. In some embodiments, the search box may be displayed in response to receiving a keystroke and/or a combination of keystrokes from an input device (e.g. "Control+f" from a physical or on-screen keyboard, a functional key such as "F2", or any combination of function keys, normal keys, and modifier keys).

At step 904, the method 900 involves receiving a search input comprising a plurality of characters. The search input may be entered by a user typing into a physical or virtual keyboard, for example.

At step 906, the method 900 involves determining a search condition based on a first portion of the plurality of characters. The search condition may represent a criteria or criterion with which to search for printing devices within a printing device database. Step 906 may involve determining which characters correspond to the search condition, then determining the intended search condition from that portion of characters. Certain keywords or phrases may signal the start or end of a search condition. Identifying the portion of the search input corresponding to the search condition may be necessary when another portion of the search input corresponds to a command. For example, a search input of "install driver for printers with color" may comprise two portions: "install driver," which is the command portion; and "printers with color," which is the search condition. Note that the search condition in this example is signaled by the keyword "for." As another example, a search input of "reboot printers with duplex printing" signals the search condition "duplex printing" with the keyword "with." Other example keywords that may indicate a following search condition include "for," "with," "having," and "that," among other possible keyword signals. Furthermore, a search condition might be identified by comparator operators, such as "=", "<", ">", or any combination thereof.

In some instances, the search input does not include a command portion. This may be the case when a user wishes to locate one or more printing devices, but not necessarily perform an action in association with those printing devices. In these instances, step 906 might not involve separating the search input into two or more portions.

In some embodiments, the first portion of the search input may contain spelling mistakes or other imperfections such that it does not exactly match any known search criteria. In these cases, a "fuzzy" search (i.e. approximate string matching) techniques may be employed in order to identify the closest known search criterion. Such techniques may determine an extent of similarity between the first portion of the search input and one or more known search criteria. In some implementations, if this extent of similarity between the first portion and a known search criterion exceeds a threshold extent of similarity, the known criterion may be used as the search condition for the remainder of method 900.

In some cases, two or more known criteria may meet or exceed this threshold extent of similarity with the first portion of the search input. In such scenarios, a prompt may be displayed requesting the user to select the intended search condition.

At step 908, the method 900 involves determining a command based on a second portion of the plurality of characters. Step 908 may involve determining the command portion (i.e. the second portion) as the remaining portion of the search input that is not the search condition portion. In some implementations, the command portion might also be signaled by a keyword or phrase. Some example keywords that may be indicative a following command include "execute" and "perform," among other possible keywords. Alternatively, the command portion may be identified as the portion of the search input that precedes a search condition keyword. Note that the first portion of the plurality of characters representing the search condition and the second portion of the plurality of characters representing the command may be in any order. In some cases, the search condition may come before the command in a given search input. In other cases, the command may come before the search condition in a different search input. Furthermore, when multiple commands and/or search conditions are present, they may appear in any order, depending upon the particular search input.

At step 910, the method 900 involves determining whether at least one printing device matches the search condition. In some cases, a search condition may not correspond to any printing device within a printing device database. For example, a search condition of "ppm>300" may not correspond to any printing devices in a database because no entries exist within the database associated with a printing device capable of printing greater than three-hundred pages per minute. If no printing devices are found that meet the criterion or criteria specified by the search condition, the method 900 returns to step 904 to receive a new search input. If at least one printing device is found, the method 900 moves on to step 912.

Similarly to step 908 above, the second portion of the search input may contain spelling mistakes or other errors such that the second portion does not exactly match a known command. The known commands may be the commands and their assigned names from a command list database. A computing device might employ "fuzzy" search techniques similarly to those described above in step 908 to determine a command that closely matches the second portion of the search input. If the extent of similarity between the second portion of the search input and a command exceeds a threshold extent of similarity, the matching command may be utilized for the remainder of method 900. In some cases, if two or more commands "match" the second portion of the search input, a prompt may be displayed requesting the user to select the intended command.

At step 912, the method 900 involves identifying one or more printing devices that meet a criterion specified by the search condition. Step 912 may involve querying a printing device database for the printing devices with the search condition. The printing device database may return one or more printing devices that satisfy the search condition criterion or criteria.

At step 914, the method 900 involves executing the determined command in association with a particular printing device. The determined command specifies a device on which the command can be executed. For example, an "install_driver" command specifies execution on a computing device, since the computing device utilizes the driver in order to communicate with the printing device. Note that the command "install_driver" is executed on the computing device in association with a particular printing device; that is, the driver installed on the computing device is a driver for that particular printing device.

In some cases, a command, such as "keyboard_setting," specifies execution on a printing device, since the keyboard settings are associated with the operation panel of a printing device. In these cases, the command "keyboard_setting" is executed on a particular printing device. In some implementations, this involves transmitting the command to that particular printing device instructing it to execute the "keyboard_setting" command with the desired settings.

It should be understood that the examples described with respect to FIG. 8 or FIG. 9 are merely example operations. Other operations may also be performed without departing from the scope of this application.

IX. Variations

In some embodiments, a command list database may store one or more audio segments of a user-assigned voice command. During operation, the microphone 312 may capture a user speaking a command, and a computing device may subsequently compare the captured audio segment to the stored audio segment in the command list database. Such an audio comparison may produce a value indicative of the degree of similarity between the recently-captured spoken command and the stored spoken command. If that value exceeds a threshold degree of similarity, the computing device may identify the recently-captured spoken command as the command associated with the stored spoken command.

X. Conclusion

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A method comprising:
   causing a display device to display a search prompt into which a search input can be entered;
   receiving, at a computing device, a plurality of characters that collectively form the search input;
   determining a search condition based on a first portion of the plurality of characters, wherein a given search condition is indicative of a criterion for a characteristic of a given printing device;
   determining a command based on a second portion of the plurality of characters, wherein a given command is indicative of an executable action, wherein the given command specifies a given device on which to execute the action, and wherein the given command is executable in association with a printing device;
   determining whether at least one printing device of a plurality of printing devices meets the criterion specified by the search condition;
   based on determining that at least one printing device meets the criterion, identifying one or more printing devices that meet the criterion specified by the search condition; and
   executing the determined command in association with at least one particular printing device from among the identified one or more printing devices on a device specified by the determined command,
   wherein determining the command comprises determining that the second portion of the plurality of characters matches a name of the command in a command database, wherein the command database comprises a plurality of entries, and wherein a particular entry is associated with a particular command and includes a name of the particular command, and
   wherein the name of the particular command is in a first language, wherein the particular entry further includes the name of the particular command name in a second language, and wherein determining the command further comprises determining that the second portion of the plurality of characters matches at least one of (i) the name of the command in the first language and (ii) the name of the command in the second language.

2. The method of claim 1, further comprising:
   receiving a name input indicative of a name representative of the command; and
   designating the name input as the name of the command in the command database.

3. The method of claim 1, wherein the second portion of the plurality of characters does not match any names of commands in the command database, and wherein the method further comprises:
   determining an extent of similarity between the second portion of the plurality of characters and the name of the command in the command database; and
   based on the extent of similarity exceeding a threshold extent of similarity, determining that the second portion of the plurality of characters corresponds to the command.

4. The method of claim 3, wherein the name of the command is a name of the first command, wherein the extent of similarity is a first extent of similarity, and wherein the method further comprises:
   determining that a second extent of similarity between the second portion of the plurality of characters and a name of a second command in the command database exceeds the threshold extent of similarity; and
   based on the first extent of similarity and the second extent of similarity both exceeding the threshold extent of similarity, causing a display unit to display a prompt for selecting one of the first command and the second command.

5. The method of claim 1, wherein identifying the one or more printing devices comprises:
   querying a printing device database for printing devices that meet the criterion for the characteristic specified by the determined search condition, wherein the printing device database comprises a plurality of entries corresponding to the plurality of printing devices, and wherein a given entry includes (i) an identifier of a certain printing device and (ii) a value of the characteristic of the certain printing device; and in response to querying the printing device database, receiving one or more identifiers corresponding to the one or more printing devices.

6. The method of claim 1, wherein the search condition is a first search condition, wherein the one or more printing devices are one or more first printing devices, and wherein the method further comprises:

determining a second search condition based on a third portion of the plurality of characters;

determining a logical operator based on a fourth portion of the plurality of characters;

identifying, based on the second search condition, one or more second printing devices that correspond to the characteristic specified by the second search condition; and determining one or more third printing devices by applying the logical operator to the one or more first printing devices and the one or more second printing devices.

7. The method of claim 1, further comprising:

based on determining that no printing devices of the plurality of printing devices meet the criterion, providing a prompt for a new search input.

8. The method of claim 1, further comprising:

based on the determined command specifying the computing device, executing the determined command in association with the at least one particular printing device on the computing device.

9. The method of claim 1, further comprising:

based on the determined command specifying the at least one particular printing device, executing the determined command on the at least one particular printing device.

10. A non-transitory computer-readable medium having instructions stored thereon that, upon execution by at least one processor, cause a computing device to perform operations comprising:

causing a display device to display a search prompt into which a search input can be entered;

receiving, at a computing device, a plurality of characters that collectively form the search input;

determining a search condition based on a first portion of the plurality of characters, wherein a given search condition is indicative of a criterion for a characteristic of a given printing device;

determining a command based on a second portion of the plurality of characters, wherein a given command is indicative of an executable action, wherein the given command specifies a given device on which to execute the action, and wherein the given command is executable in association with a printing device;

determining whether at least one printing device of a plurality of printing devices meets the criterion specified by the search condition;

based on determining that at least one printing device meets the criterion, identifying one or more printing devices that meet the criterion specified by the search condition; and executing the determined command in association with at least one particular printing device from among the identified one or more printing devices on a device specified by the determined command, wherein determining the command comprises:

determining that the second portion of the plurality of characters matches a name of the command in a command database, wherein the command database comprises a plurality of entries, and wherein a particular entry is associated with a particular command and includes a name of the particular command, and wherein the name of the particular command is in a first language, and wherein the particular entry further includes the name of the particular command name in a second language, and wherein determining the command further comprises:

determining that the second portion of the plurality of characters matches at least one of (i) the name of the command in the first language and (ii) the name of the command in the second language.

11. The non-transitory computer readable medium of claim 10, wherein causing the display device to display the search prompt is performed by the computing device in response to receiving an input keystroke from a keyboard.

12. The non-transitory computer readable medium of claim 10, wherein the search input is a particular search input, and wherein the operations further comprise:

receiving a search input history comprising a plurality of search inputs, wherein the particular search input is among the plurality of search inputs;

causing a display unit to display a portion of the plurality of search inputs including the particular search input; and receiving a selection of the particular search input.

13. A method comprising:

causing a display device to display a search prompt into which a search input can be entered;

receiving, at a computing device, a plurality of characters that collectively form the search input;

determining a search condition based on a first portion of the plurality of characters, wherein a given search condition is indicative of a criterion for a characteristic of a given printing device;

determining a command based on a second portion of the plurality of characters, wherein a given command is indicative of an executable action, wherein the given command specifies a given device on which to execute the action, and wherein the given command is executable in association with a printing device;

determining whether at least one printing device of a plurality of printing devices meets the criterion specified by the search condition;

based on determining that at least one printing device meets the criterion, identifying one or more printing devices that meet the criterion specified by the search condition; and executing the determined command in association with at least one particular printing device from among the identified one or more printing devices on a device specified by the determined command, wherein the search condition is a first search condition, wherein the one or more printing devices are one or more first printing devices, and wherein the method further comprises:

determining a second search condition based on a third portion of the plurality of characters;

determining a logical operator based on a fourth portion of the plurality of characters;

identifying, based on the second search condition, one or more second printing devices that correspond to the characteristic specified by the second search condition; and determining one or more third printing devices by applying the logical operator to the one or more first printing devices and the one or more second printing devices.

14. The method of claim 13, wherein determining the command comprises:
   determining that the second portion of the plurality of characters matches a name of the command in a command database, wherein the command database comprises a plurality of entries, and wherein a particular entry is associated with a particular command and includes a name of the particular command.

15. The method of claim 14, further comprising:
   receiving a name input indicative of a name representative of the command; and
   designating the name input as the name of the command in the command database.

16. The method of claim 15, wherein the name of the particular command is in a first language, and wherein the particular entry further includes the name of the particular command name in a second language, and wherein determining the command further comprises:
   determining that the second portion of the plurality of characters matches at least one of (i) the name of the command in the first language and (ii) the name of the command in the second language.

17. The method of claim 14, wherein the second portion of the plurality of characters does not match any names of commands in the command database, and wherein the method further comprises:
   determining an extent of similarity between the second portion of the plurality of characters and the name of the command in the command database; and
   based on the extent of similarity exceeding a threshold extent of similarity, determining that the second portion of the plurality of characters corresponds to the command.

18. The method of claim 17, wherein the name of the command is a name of the first command, wherein the extent of similarity is a first extent of similarity, and wherein the method further comprises:
   determining that a second extent of similarity between the second portion of the plurality of characters and a name of a second command in the command database exceeds the threshold extent of similarity; and
   based on the first extent of similarity and the second extent of similarity both exceeding the threshold extent of similarity, causing a display unit to display a prompt for selecting one of the first command and the second command.

19. The method of claim 13, wherein identifying the one or more printing devices comprises:
   querying a printing device database for printing devices that meet the criterion for the characteristic specified by the determined search condition, wherein the printing device database comprises a plurality of entries corresponding to the plurality of printing devices, and wherein a given entry includes (i) an identifier of a certain printing device and (ii) a value of the characteristic of the certain printing device; and
   in response to querying the printing device database, receiving one or more identifiers corresponding to the one or more printing devices.

\* \* \* \* \*